United States Patent Office
3,436,335
Patented Apr. 1, 1969

3,436,335
SERIAL REFORMING WITH A RARE EARTH METAL IN ALL BUT LAST STAGE
John Maziuk, Green Fields, N.J., assignor to Mobil Oil Corporation, a corporation of New York
No Drawing. Filed Mar. 25, 1966, Ser. No. 537,272
Int. Cl. C10g 39/00, 35/08
U.S. Cl. 208—65                    8 Claims

ABSTRACT OF THE DISCLOSURE

A naphtha hydrocarbon is catalytically reformed by sequentially passing the hydrocarbon through a plurality of catalyst beds. The last bed contains a catalyst comprising an acid anion and a hydrogenation-dehydrogenation metal on an alumina containing support. The remaining beds contain a catalyst comprising an acid anion, a rare earth metal, and a hydrogenation-dehydrogenation metal on an alumina containing support.

---

This invention relates to methods of employing hydrogenation-dehydrogenation type catalysts in conversion processes. More particularly, the invention relates to a conversion process wherein platinum type catalysts promoted with rare earth acid salts are employed in the upgrading of hydrocarbons.

In a more particular aspect, the invention relates to a conversion method wherein selective platinum reforming catalysts modified with rare earth acid salts on a suitable carrier material are employed, as for example, in reforming to produce high octane gasoline and aromatic hydrocarbons.

Reforming is well-known and essential to the petroleum industry. The term reforming refers to the catalytic process for upgrading virgin or cracked naphthas to produce a relatively high octane hydrocarbon product. In reforming a number of reactions occur with each reaction being favored by a given set of conditions. Endothermic reactions predominate in the first stages of reforming while exothermic reactions predominate in the later stages of reforming so that the overall reforming reaction gradually becomes exothermic.

To take advantage of this reaction sequence it has become a general practice in catalytic reforming to employ in combination a plurality of adiabatic fixed-bed reactors in series with provision for reheating hydrocarbon reactant between reactors. Generally the pressure employed in each reactor is decreased in the direction of hydrocarbon flow to avoid use of expensive compressors between reactor stages. The vapor inlet temperature selected for each reactor is dependent upon the charge stock, composition, the feed hydrogen to hydrocarbon ratio, the reactant space velocity, the type and distribution of catalyst among the plural reactors, the degree of conversion desired and product selectivity desired from each reactor stage. In addition, in the usual reforming processes an unequal distribution of catalyst is employed among reactors.

Catalytic reforming of hydrocarbons generally comprises four major reactions which can be adjusted in magnitude by reaction conditions and catalyst employed. Some of these reactions predominate in a particular stage of the reforming process. The predominate reaction in the first stages of reforming is dehydrogenation to convert naphthenes to aromatics, a major octane-improving conversion. Other dehydrogenation reactions, such as the conversion of paraffins to olefins, or the dehydroisomerization of alkylpentanes to form benzene or alkylbenzenes and hydrogen are controllable within limits but are generally subsequent to the conversion of naphthenes to aromatics. Although the function of a dehydrogenation catalyst such as platinum may be considered the sole requirement for the dehydrogenation step, the presence of an additional acidic anion can assist this function. The acidic anion also can promote the isomerization of a five-membered ring as in the dehydroisomerization conversion. The major reforming reaction which occurs in the intermediate stages is dehydrocyclization in which straight chain paraffins are converted to aromatics with a consequent increase of octane rating. In dehydrocyclization reactions, it is believed that the paraffins are first cyclized and then dehydrogenated to form aromatics. Paraffin cyclization is regarded as the controlling step and requires both platinum type and acidic catalyst functions. A third reaction is the isomerization of paraffins, olefins, naphthenes and aromatics. The isomerization of paraffins results in significant octane improvement while the other isomerizing reactions are usually intermediate or incidental to other major reactions. Isomerization requires an acidic function. A fourth reforming reaction which occurs in the latter stages of reforming is selective hydrocracking by which long chain paraffins are beneficially cracked to higher octane lower paraffins, preferably with a minimum of gas or coke formation. Acidic sites are necessary for hydrocracking. However, it is essential that the acidic function be selective in order to avoid gas and coke formation as a result of excess hydrocracking.

The overall reactions in reforming makes the process highly endothermic. As mentioned above, it has been found beneficial to use a plurality of reactors with reheating between stages. This scheme promotes the use of three or more reactors of the same or different sizes of catalyst beds for sequential flow through at least three arrangements of catalyst beds with any one arrangement suited for parallel flow through at least two beds of catalyst. However, because of the natural sequence of reactions which conveniently divides the reforming process into substantially three stages, the plural reactor system comprises essentially at least one adiabatic reactor and an alternate reactor in the sequence of reactors approaching isothermal reaction conditions.

In the first reactor, dehydrogenation of naphthenes to aromatics is a predominant reaction. Other reactions occurring to a lesser degree are the cracking of naphthenes to give paraffins and isomerization. The dehydrogenation of the naphthenes is rapid at the top of the first reactor bed and significantly slows down through the bed as the temperature decreases markedly and equilibrium conversion conditions are approached. As disclosed in U.S. Patent No. 2,946,737 which is incorporated herein by reference, as the temperature in the first reactor decreases down through the bed, reaction conditions are reached at which there occurs a vital cessation of the naphthlene dehydrogenation reaction. As disclosed in the patent, it is highly desirable to avoid operating below this quench point since under such conditions the naphthenes lend themselves for the most part to undesired conversion by cracking.

In the second reactor, the dehydrocyclization of paraffins is the primary reaction which produces aromatics. Additionally, the remaining naphthenes are further dehydrogenated. Paraffin isomerization and hydrocracking also occur therein especially at high severities. The temperature drop in the second reactor is generally lower than that in the first reactor since dehydrogenation is taking place to a much lesser extent. At the outlet of the second reactor the aromatic concentration is close to equilibrium and is much higher than at the outlet of the first reactor.

In the final reactor dehydrocyclization and hydrocracking reactions predominate. Generally it has been found that although the temperature may drop slightly near the top of the bed, exothermic hydrocracking increases the bed outlet temperature to a higher level and in an amount sufficient to regard the reactor as being isothermal. Thus, the equilibrium ratio of aromatics to naphthenes is further increased and is at an optimum level at the outlet of the third reactor. It is desirable however, that the temperature level and catalyst activity be such that only selective hydrocracking take place in order to avoid cracking paraffins to dry gas and coke.

In practice it has been found desirable for optimum performance to balance the acidic and the hydrogenation-dehydrogenation functions of reforming catalysts as a function of the charge stock composition, operating conditions, and desired reformate product composition. Platinum on chlorided alumina catalysts for example and the like have found extensive application in reforming by providing both required catalyst functions in a serviceable ratio. However, because of the expense of platinum metal, practical considerations limit the amount of platinum in these catalysts within rather narrow limits, for example, from about 0.1% to about 1.0% by weight of platinum in the reforming catalysts. An increase thereabove of the platinum content in these catalysts does not usually result in a proportionate increase in activity to warrant its addition. Thus, in practice, the platinum content of a reforming catalyst is within relatively narrow limits of from about 0.35% to about 0.6% platinum by weight of the catalyst. At these concentrations, the active platinum sites are found spread throughout the support matrix and the activity level of the hydrogenation-dehydrogenation function can be limited by practical reasons. Significantly, the catalyst acidic function has also been limited to maintain a desired balance with the hydrogenating function for optimum reforming.

Methods are available for favoring one or more of the major reforming reactions at the expense of the remaining reactions by altering the catalyst functional balance with various promoters of catalyst poisons. For example, it has been proposed to increase the available acidic sites of a platinum on alumina catalyst by the addition of silica, or a halide such as chlorine or florine, or to decrease the acidic sites by, for example, the addition of nitrogen compounds or water. It is also well-known that promoters may be combined with the catalyst to activate the catalyst function in a desired direction.

An important consideration which must be taken into account in reforming processes is the catalyst cycle life. By catalyst cycle life is meant the period of time a catalyst can be employed under a particular set of conversion conditions while producing a product having a desired predetermined hydrocarbon composition. The catalyst cycle life in reforming reactions varies depending upon the type of charge and upon the conditions employed. It is desirable to maintain good catalyst activity and selectivity while minimizing catalyst aging for a particular reformer feed stock and particular reforming conditions in order to minimize catalyst regeneration. The less catalyst regeneration required to produce a particular reformate, the more economical is the overall reforming process.

Accordingly, it is an object of this invention to provide an improved reforming process. A further object is to provide an improved reforming process arranged to employ selective catalysts in a desired manner wherein the essential reforming functions are controlled to their optimum utilization. A still further object of this invention is to employ highly selective and active platinum-alumina type reforming catalysts in such a manner that the catalysts find their maximum utility.

Other objects and advantages of this invention will become apparent to those skilled in the art from the following detailed description and examples.

In accordance with the process of the present invention, the feed stock to be converted is directed to be sequentially contacted with a plurality of catalyst beds under conversion conditions. The catalyst employed in all but the last contacting zones comprises a hydrogenation-dehydrogenation metal supported catalyst modified with a rare earth acid salt as a promoting compound. The last bed of catalyst comprises a supported hydrogenation-dehydrogenation metal component which contains acidic anion but is not modified with a rare earth metal. It has been found that improved activity and selectivity as well as increased catalyst cycle life are obtained when the process of this invention is employed. Further, it has been found that when the catalyst system of this invention is employed, the catalyst cycle life is greater than would be obtained when either of the two catalyst types were used exclusively. This is very significant in terms of reducing regeneration frequency and improving overall process economics.

The process of this invention can be employed to promote reactions including hydrogenation, dehydrogenation, hydrocracking, dehydrocyclization and isomerization when the feed stock and the reaction conditions are properly adjusted. Thus the process of this invention can be employed in the dehydrogenation of paraffins to olefins, of naphthenes to aromatics, of mono-olefins to diolefins; the hydrogenation of olefins to paraffins; the dehydrocyclization of paraffins to aromatics, such as n-hexane to benzene or n-heptane to toluene; the isomerization of paraffins, or methylcyclopentane to cyclohexane, of alkylbenzenes, such as ethylbenzene to xylene; the hydrocracking of paraffins and naphthenes; and in many related conversions such as alkylation, dealkylation, disproportionation, cracking, hydrodesulfurization, polymerization, halogenation and the like.

The process of the present invention can be advantageously utilized to reform naphtha boiling range charge stocks of varied hydrocarbon composition. In general, hydrocarbon charge stocks, undergoing reforming in accordance with the present invention, comprise mixtures of hydrocarbons and particularly petroleum distillates boiling within the range from about 60° F. to about 450° F., which range includes naphthas, gasolines and kerosine. It is however, preferred to use a selected fraction such as a naphtha having an initial boiling point of about $C_5$ hydrocarbons and an end boiling point above about 250° F. and preferably an end boiling point of from about 320° F. to about 430° F.

The reforming of naphtha boiling hydrocarbons is generally carried out at a temperature between about 700° F. and 1,000° F. and preferably at a temperature between about 850° F. and about 975° F. The pressure during reforming is generally within the range of about 100 to about 1,000 pounds per square inch gauge and preferably between about 200 and about 700 pounds per square inch gauge. The liquid hourly space velocity employed, i.e., the liquid volume of hydrocarbon per hour per volume of catalyst, is between about 0.1 and about 10 and preferably between about 0.5 and about 4. In general, the molar ratio of hydrogen to hydrocarbon is between about 1 and about 20 and preferably between about 4 and about 12.

When it is desired to reform a naphtha hydrocarbon feed, the process of this invention is carried out in a plurality of adiabatic reactors, each of which is associated with a heater adapted to preheat the feed. The naphtha feed is preheated and then contacted with the catalyst in the first reactor. The primary reaction which occurs therein is the dehydrogenation of naphthenic hydrocarbons to produce aromatics. Since the overall reactions in the first reactor are endothermic, the effluent therefrom must be preheated prior to contacting the catalyst in the second reactor in order to promote reactions therein. In the second reactor, the primary reaction which occurs is the dehydrocyclization of $C_6+$ paraffinic hydrocarbons to produce aromatic hydrocarbons. As the effluent is alternately heated and contacted with the catalyst in the remaining reactors, the amount of aromatic hydrocarbons therein is increased, which results in a shift of the reactions to isomerization and hydrocracking to produce isoparaffinic hydrocarbons. Thus, as the naphtha feed progresses through the reactor series, the overall reaction becomes exothermic which results in less heat being required in subsequent preheating steps. The naphtha feed is preheated to a temperature within the range set forth above and is adjusted according to the feed composition, hydrogen to hydrocarbon ratio, hydrogen pressure and products desired. When products having a relatively high octane are desired, the conditions in the reactor become increasingly severe. In the process of this invention, the number of adiabatic reactors which can be employed is from 2 to 12 and preferably from 3 to 5. The effluent from the final reactor is directed to a gas separator to produce a reformate stream and a gas stream. The reformate is recovered and a portion of all of the gas stream, which is rich in hydrogen is recycled to the first reactor in the series.

In all but the last conversion stage of this invention, the catalyst employed therein has a hydrogenation-dehydrogenation function and an acid function promoted by a rare earth metal. The hydrogenation-dehydrogenation function of the catalyst is provided by a metal, a compound of a metal or combination thereof, of Groups VI-B, VII-B, and VIII of the Periodic Table including the metals of the platinum group consisting of platinum, palladium, ruthenium, osmium, rhodium, and irridium; as well as other metals including iron, cobalt, nickel, chromuim, molybdenum, tungsten, manganese and rhenium; and other materials which provide a hydrogenation-dehydrogenation catalyst function. Platinum is a particularly desired component, especially when combined with alumina, since the composites of platinum and alumina have been found very active and selective, particularly in reforming operations. With platinum, a preferred method of incorporation is to contact a slurry of alumina with a solution comprising chloroplatinic acid, although other suitable platinum solutions can be employed. Thus, solutions or suspensions of platinum cyanide, platinum sulfide, platinum hydroxide, or platinum oxide can be used. The concentration of metal providing the hydrogenation-dehydrogenation function in the final catalyst composite will generally be in the range of from about 0.01 to about 10%, usually from about 0.1 to about 5%, preferably from about 0.3 to about 1% by weight.

The compounds which beneficially alter the activity and selectivity of reforming catalysts in accordance with this invention are those of the rare earth and related Group III metal acid salts. The metals which broadly fall within this definition are yttrium, lanthanum, cerium, praseodymium, neodymium, samarium, europium, gadolinium, terbium, dysprosium, holmium, erbium, thulium, ytterbium and lutetium and will be hereinafter referred to as rare-earth type metals. The compounds of these metals which may be used to advantage in the catalyst of this invention are those acidic in nature and sufficiently stable to avoid decomposition during use. Accordingly the halides, sulfides, silicates, alumino-silicates and phosphates are considered to come within the definition but are not to be regarded as equivalents in their effects. The reforming compound depends in part upon the particular reforming function desired for the catalyst product, since each affects somewhat differently the catalyst functions. In accordance with this invention the halides of yttrium, cerium, and samarium are preferred, with the chlorides being particularly preferred due to their acidic nature and ready solubility.

The promoting compounds of the reforming catalyst comprise a small part of the total catalyst product, and generally the rare-earth type metal amounts to from about 0.01 to about 10%, usually from about 0.1 to about 8% and preferably from about 0.4 to about 7% of the total catalyst by weight. The acidic anion of the compound is also present in small amounts on the catalyst product, depending upon the compound, catalyst age, method of impregnation and the like. Preferably, however, the compounds are rare-earth type chlorides, as hereinabove mentioned, in which cases the chloride content is generally from about 0.01 to about 10%, and preferably from about 0.5 to about 3% of the catalyst product by weight.

The carrier materials employed herein are an inorganic metal oxide, preferably alumina in either the gamma or eta form which can be modified by one or more component carrier materials selected from the group of components comprising silica, zirconia, magnesia, titania and thoria. Combinations of the above materials can also be employed with the alumina carrier, or as both a carrier and a catalyst function, for example, silica-alumina, silica-zirconia, magnesia-alumina, alumina-titania, alumina-silica-zirconia, alumino-silicates, etc.

The acidic function of the catalyst is provided at least in part by halogen combined with the rare-earth type metal described herein. The halogen may be incorporated with the catalyst by any suitable means. It may be combined with another functional agent, as for example, chloroplatinic acid or chloropalladic acid. It may be added as the elemental gas as chlorine, florine, bromine or iodine. Or it may be added separately or in the reactant stream, as an organic, inorganic halide or acid, for example, methyl chloride, ammonium chloride, carbon tetrachloride, hydrochloric acid, chloroform or others. The amount of the halogen acidic agent present on the final catalyst depends on the particular halogen, the desired acid activity, and whether another acidic agent is present. As mentioned above, the halogen content of the prepared catalyst is generally from about 0.01 to about 10%, usually less than 5% by weight.

In addition to the above constituents, the catalyst employed in all but the last conversion stages of the present invention may comprise one or more other promoting activating or stabilizing agents. For example, dehydrogenation activity may be enhanced by the addition of hydrocracking suppressors including compounds which exhibit basic properties under reforming conditions such as certain nitrogen compounds. Preferably, these basic hydrocracking suppressors that may be used in the process of the present invention comprise halogen-free compounds which are readily convertible to ammonia. Examples of these include ammonia, soluble nitrates and nitrites, nitrogen oxides, nitro hydrocarbons, amines, quaternary ammonium compounds, hydrazine, and other organics such as pyridine and pyrrole, and their derivatives. Other basic hydrocracking suppressors include alkali and alkaline earth oxides and hydroxides, for example, those of lithium, sodium, potassium, rubidium, cesium, magnesium, calcium strontium and barium. In addition, dehydrocyclization reactions can be favored relatively by the addition of certain basic phosphorous compounds such as aluminum phosphate, phosphine and its derivatives.

The catalysts employed in all but the last conversion stage of this invention can be prepared by any one of several methods which will vary, depending upon the desired composition and constituents therein. For example, suitable mixtures of a platinum type metal and the rare earth promoting metal as salt solutions can be incorporated simultaneously with the carrier material or each can be added separately with drying and/or calcination between impregnation stages. However, a coimpregnation method is generally preferred primarily for convenience. Thus, a rare earth promoted reforming catalyst can be prepared by mixing a solution of chloro-platinic acid and a compound of a rare earth or related metal, adding this solution to a solution of hydrous alumina, drying the solids after coimpregnation, pelleting or forming the material into particles and calcining the resultant particles. The alumina can be prepared by precipitating an alumina gel from an aqueous aluminum salt solution with an alkaline compound or the like.

It has been found that the catalysts used in the present invention characteristically can retain stable chlorine in concentrations significantly higher than a corresponding platinum-alumina catalyst. Typically a 0.6% platinum-on-alumina catalyst contains stable chlorine in an amount of about 0.6% to 0.7%. The chlorine level may be increased to about 2–3% by hydrogen chloride addition, but this high chlorine level is unstable and is reduced quickly in operation. Yet, it has now been found that a 0.6% platinum-on-alumina catalyst promoted with yttrium or cerium chloride initially has chlorine in an amount of about 2 to 3%, which remains stable at about 1.5 to 2% even after regeneration. It is known that increased halogen levels favor the acidic function of reforming catalysts and promote conversion by hydrocracking at the expense of selectivity. However, even though the mechanism of the catalyst is not clearly understood, it has been found that the addition of halogen as a compound of certain rare-earth type metals not only increases the hydrocracking activity of the new composite, but also significantly improves catalyst selectivity. Thus the overall activity is increased, and an optimum selectivity can be maintained by the addition of certain promoters of the rare-earth type chlorides.

Apparently the rare-earth type elements affect variously the functions of a reforming catalyst. Although there is no desire to be limited by any one theory, evidently, as it is theorized on the basis of consistent experimental results, the rare-earth type cations preferentially occupy catalyst sites of certain activities and thereby create sites which have slightly altered functional activity. This effect may be illustrated by the following brief examples: promotion by cerium or yttrium chloride effects increased hydrocracking and dehydrogenation activity in approximately equal amounts; promotion by cerium acetate or yttrium nitrate suppresses hydrocracking and relatively increases dehydrogenation; promotion by lanthanum chloride or samarium chloride increases hydrocracking.

In a specific embodiment an alumina is impregnated as an aqueous slurry by contacting with a solution of chloroplatinic acid and yttrium chloride in a quantity and ratio sufficient to effect after drying, forming and calcining, a resulting composite of alumina containing from about 0.3 to about 0.7% of platinum, from about 0.4 to about 7% of yttrium and from about 0.6 to about 3% of chlorine. The composite is then dried at a temperature between about 240° F. and 450° F. and is thereafter calcined at about 650° F. to 1,000° F. to yield the desired platinum-yttrium-alumina-chlorine catalyst.

The catalyst employed in the final reaction zone in this process comprises a hydrogenation-dehydrogenation metal component modified with material providing acid sites on an alumina type support. The hydrogenation-dehydrogenation component is a metal selected from Group VI–B, VII–B and VIII of the Periodic Table including the platinum group. It is preferred that platinum be employed as the hydrogenation-dehydrogenation component since it has been found to effectively maintain its activity and selectivity while employed in the reforming of naphtha hydrocarbons. The hydrogenation-dehydrogenation component is present in amounts of from about .01 to 10 percent by weight and preferably from about 0.3 to about 0.7 percent by weight based upon the weight of the final catalyst.

The acid function employed in the final reaction stage is provided by anions which are sufficiently stable to resist decomposition under the reaction conditions. Accordingly, the acidic function employed depends in part on the type of conversion being effected and includes halides, sulfide, silicate, aluminosilicate phosphate and the like. It is preferred that in the reforming of naphtha hydrocarbons, the halides be employed and more preferably chloride. The acidic anion is present in the catalyst in an amount of from about 0.01 to about 10 percent by weight and preferably from about 0.6 to about 3.0 percent by weight based upon the weight of the final catalyst. When reforming of naphthas is effected, it is preferred to employ platinum as the hydrogenation-dehydrogenation component in an amount of from about 0.30 to about 0.65 weight percent and chloride in an amount of from about 0.40 to about 0.75 weight percent.

The support employed for the catalyst in the final reaction stage is an eta or gamma alumina or a mixture thereof which may be modified by one or more components selected from the group of silica, zirconia, magnesia, titania, and thoria. The type of support employed is dependent upon the type of conversion which is desired. When it is desired to effect the reforming of naphtha, it is preferred to employ a support which consists of alumina either in the eta or gamma form and preferably in the eta form.

The final stage catalyst can be further modified with other promoting, activating or stabilizing agents. For example, in reforming reactions, it has been found desirable to partially sulfide the catalyst in order to improve effective control of hydrocracking reaction. The sulfide anion can be provided by treating the catalyst with sulfur containing compounds such as carbon bisulfide, hydrogen sulfide, thiophene and the like. This catalyst can be further modified to afford improved hydrocracking control in a manner described above for the rare earth modified catalysts.

The alumina support and the impregnation thereof with the hydrogenation-dehydrogenation component and acidic anions can be carried out in a manner described above for the rare earth modified catalyst and is well known. For example, an alumina gel can be impregnated with a desired amount of chloro-platinic acid, subsequently dried and calcined to produce the final catalyst.

The following examples are intended to assist in a fuller understanding of the present invention and are not intended to limit the same.

EXAMPLE I

Three samples of a Mid-Continent naphtha fraction boiling in the range of from 180° F. to 360° F. were obtained and each was contacted with a different catalyst system under reforming conditions. The first naphtha sample was contacted under adiabatic conditions with a commercial chlorine containing platinum on eta alumina catalyst having about 0.6 weight percent platinum and 0.7 weight percent chlorine in three reactors having a catalyst fill ratio of 0.5/1/1. This catalyst will be hereinafter designated as Pt-Al. The second naphtha sample was contacted under adiabatic conditions with a chlorine containing platinum on eta alumina catalyst which was modified with yttrium in three reactors having a catalyst fill ratio of 0.5/1/1. This catalyst contained 0.65 weight percent platinum, 1.1 weight percent chlorine and 0.81 weight percent yttrium. The third naphtha sample was contacted under adiabatic conditions in two separate beds with a chlorine containing platinum on eta alumina catalyst which was modified with yttrium and in a third bed under adiabatic conditions with the catalyst employed for the first naphtha sample. The yttrium modified catalyst employed for the third sample contained 0.56 weight percent platinum, 2.1 weight percent chlorine and 3.78 weight percent yttrium. The catalyst fill ratio in the three reactors employed for the third naphtha sample was about 0.5/1.0/1.0.

In each case, the reaction conditions of pressure, hydrogen to hydrocarbon mole ratio, and weight hourly space velocity for the three samples were maintained as consistent as possible. Total pressure was maintained at 200 p.s.i.g., hydrogen to hydrocarbon mole ratio was maintained at about 4 to 1 and weight hourly space velocity was 1.0. While it was possible to closely control hydrogen pressure and hydrogen to hydrocarbon mole ratio, the liquid hourly space velocity (vol.) maintained for the three naphtha samples was varied slightly due to the difference in catalyst density. However, the weight hourly space velocity was maintained at 1.0 for all three naphtha samples. The liquid hourly space velocity (vol.) maintianed for the first sample was 0.97. The liquid hourly space velocity (vol.) maintained for the second sample was 1.16 while that maintained for the third sample was 1.07.

The catalyst employed with the second naphtha sample was prepared by first mixing aluminum turnings in water at about 80° F. in the presence of $HgCl_2$ to obtain crystalline hydrated alumina. The $HgCl_2$ acts as an accelerator in the reaction. The hydration reaction was continued until gas formation ceased which lasted about 48 hours. The reaction mixture was then stirred to form a slurry which was then mixed with chloroplatinic acid and yttrium chloride. The resultant mixture was stirred for about 8 hours and then dried at about 240° F. for about 16 hours. The dried cake was ground to a powder; mixed with about 2 wt. percent stearic acid and molded to tablets about ⅛ inch thick and ⅛ inch diameter. The tablets were calcined in gas flow (98% nitrogen, 2% air) to 850° F. and then 100% air for about 3 hours. The tablets were then air cooled to room temperature. This catalyst will be designated hereinafter as PtY (1.1% Cl).

The catalyst employed in the first two reactors with the third naphtha sample was prepared in a manner described above for the catalyst employed for the second naphtha sample. This catalyst contained 0.56 weight percent platinum, 2.1 weight percent chlorine and 3.78 weight percent yttrium. This catalyst will be designated hereinafter as PtY (2.1% Cl).

For each of the three catalyst systems, the overall catalyst life was measured as a function of the reactor inlet temperature needed to produce a reformate having a desired octane rating measured as Research Octane Number. This is a convenient method of measuring catalyst activity during use. In the case of the naphtha employed as a feedstock in this example, a reactor inlet temperature of 980° F. to produce the desired reformate was considered unsatisfactory since excessive hydrocracking takes place and undesired products are produced thereby. Table I shows the catalyst lives obtained for each of the three catalyst systems when the reforming reaction was carried out at 102 $C_5$+octane (R+3 cc. TEL) and 102.5 raw octane (R+3 cc. TEL). Table II shows the reformate yields obtained from each reformed sample at 102 $C_5$+ (R+3 cc. TEL) severity.

TABLE I

| Catalyst system | Temperature, ° F. for 102 (R+3) $C_5$+ octane | | | |
|---|---|---|---|---|
| | 5 days on stream | 10 days on stream | 15 days on stream | Days on stream to 980° F. inlet |
| Pt-Al/Pt-Al/Pt-Al | 955 | 973 | 989 | 12.0 |
| PtY (1.1% Cl)/PtY (1.1% Cl)/PtY (1.1% Cl) | 943 | 962 | 989 | 12.7 |
| PtY (2.1% Cl)/PtY (2.1% Cl)/Pt-Al | 947 | 964 | 978 | 15.6 |

| | Temp., ° F. for 102.5 (R+3) raw octane | | | |
|---|---|---|---|---|
| Pt-Al/Pt-Al/Pt-Al | 956 | 974 | 990 | 12.0 |
| PtY (1.1% Cl)/PtY (1.1% Cl)/PtY (1.1% Cl) | 945 | 965 | 990 | 12.8 |
| PtY (2.1% Cl)/PtY (2.1% Cl)/Pt-Al | 949 | 966 | 978 | 15.3 |

TABLE II

| Yields, percent charge at 102 $C_5$+ octane | 5 days on stream | | | 10 days on stream | | |
|---|---|---|---|---|---|---|
| | Pt-Al | PtY (1.1% Cl) | PtY (2.1% Cl) +Pt-Al | Pt-Al | PtY (1.1% Cl) | PtY (2.1% Cl) +Pt-Al |
| $C_6$+, percent volume | 78.0 | 76.4 | 77.0 | 77.8 | 73.8 | 76.2 |
| $C_5$+, percent volume | 82.2 | 80.8 | 83.0 | 81.8 | 79.6 | 82.2 |
| $C_4$+, percent volume | 86.4 | 86.2 | 87.8 | 85.8 | 85.4 | 87.2 |
| 10 RVP, percent volume | 93.6 | 92.0 | 93.5 | 93.2 | 90.8 | 92.6 |
| Dry gas, percent weight | 8.6 | 9.4 | 8.0 | 9.0 | 10.3 | 8.7 |
| $H_2$ chg. s.c.f./b | 1,320 | 1,230 | 1,260 | 1,270 | 1,150 | 1,230 |
| $H_2$ in rec., mole percent | 86.8 | 84.4 | 87.8 | 85.3 | 81.0 | 86.3 |

As can be seen from Table I, the catalyst system employed in the process of the present invention results in increased overall catalyst cycle life and is thus a great improvement over the catalyst systems presently employed. Table II shows that these results are obtained without detriment to the reformate yield.

EXAMPLE II

Two samples of a Kuwait naphtha boiling in the range of from 190° F. to 360° F. were obtained and each was contacted with a different catalyst system under reforming conditions. The first naphtha sample was contacted under adiabatic conditions with a chlorine containing platinum on eta alumina catalyst having about 0.6 weight percent platinum and 0.7 weight percent chlorine in three reactors having a catalyst fill ratio of 0.5/1.0/1.0. This catalyst system is identified in Tables III and IV as PtAl/PtAl/PtAl. The second naphtha sample was contacted under adiabatic conditions in two separate beds with a chlorine containing platinum on eta alumina catalyst which was modified with yttrium and in a third bed under adiabatic conditions with the catalyst employed for the first naphtha sample. The yttrium modified catalyst contained 0.56 weight percent platinum, 2.1 weight percent chlorine and 3.78 weight percent yttrium. The catalyst fill ratio in the three reactors for the second naphtha sample was about 0.5/1.0/1.0. This catalyst system is identified in Tables III and IV as PtY/PtY/PtAl. The yttrium modified catalyst was prepared in a manner described in Example I.

TABLE IV

| Yields, percent charge at 99 $C_5$+ octane | 10 days on stream | | 20 days on stream | | 30 days on stream | |
|---|---|---|---|---|---|---|
| | PtAl/PtAl/PtAl | PtY/PtY/PtAl | PtAl/PtAl/PtAl | PtY/PtY/PtAl | PtAl/PtAl/PtAl | PtY/PtY/PtAl |
| $C_6$+, percent volume | 59 | 56.5 | 58 | 58 | 57 | 58.5 |
| $C_5$+, percent volume | 69.5 | 68.5 | 68.5 | 68.5 | 68 | 69 |
| $C_4$+, percent volume | 81 | 81.5 | 80.5 | 80.5 | 80 | 80 |
| $H_2$ production, s.c.f./b. chg | 550 | 520 | 530 | 570 | 510 | 570 |
| $H_2$ in recycle, mole percent | 62 | 65 | 60 | 65 | 58.5 | 63 |

In each case, the reaction conditions of pressure, hydrogen to hydrocarbon mole ratio and weight hourly space velocity were maintained as consistent as possible. Total pressure was maintained at 500 p.s.i.g., hydrogen to hydrocarbon mole ratio was maintained at about 6 to 1 and liquid hourly space velocity was 1.0.

As in Example I, the overall catalyst life was measured as a function of reactor inlet temperature needed to produce a reformate having a desired octane measured as Research Octane Number. Each naphtha sample was continued on stream for 30 days. Table III shows the inlet temperatures necessary to obtain a 99 $C_5+$ octane number (R+0 TEL) product as a function of time on stream. Table IV shows the reformate yields obtained from each reformed sample at 99 $C_5+$ (R+0 TEL) severity.

TABLE III

| Catalyst system | Temperature for 99 (R+0) $C_5+$ octane | | |
|---|---|---|---|
| | 10 days on stream | 20 days on stream | 30 days on stream |
| PtAl/PtAl/PtAl | 951 | 955 | 957 |
| PtY/PtY/PtAl | 943 | 950 | 954 |

As can be seen from Table III, the catalyst system of the present invention results in an improved overall process over the catalyst system presently employed commercially in that lower inlet temperatures are employed. Table IV shows that these results are obtained without detriment to the reformate yield.

Having fully described the process of this invention, I claim:

1. The process for reforming a naphtha hydrocarbon in a plurality of sequentially arranged catalyst beds at reforming conditions of temperature and pressure wherein the catalyst employed in each of the catalyst beds comprises an acid anion in combination with a hydrogenation-dehydrogenation component dispersed on a suitable support material, the method of improving said process for reforming naphtha hydrocarbons which comprises providing a rare earth component in combination with the catalyst employed in all of said plurality of catalyst beds except the last catalyst bed of the sequence.

2. The process of claim 1 wherein the support material is an eta or gamma alumina or a mixture thereof which may be modified by one or more components selected from the group consisting of silica, zirconia, magnesia, titania and thoria.

3. The process of claim 1 wherein the rare earth component is a rare earth type metal, a halide, a sulfide, a silicate, an aluminosilicate or a phosphate.

4. The process of claim 1 wherein the hydrogenation-dehydrogenation metal in all beds is platinum.

5. The process of claim 1 wherein the hydrogenation-dehydrogenation metal is platinum and the acid anion is chlorine in all beds.

6. The process of claim 1 wherein the catalyst in the last bed contains a hydrogenation-dehydrogenation metal in an amount of from 0.3 to 1 weight percent and an acid anion in an amount of from 0.01 to 8 weight percent and the catalyst in the remaining beds contain a hydrogenation-dehydrogenation metal in an amount of from 0.3 to 1 weight percent, an acid anion in an amount of from 0.01 to 8 weight percent and a rare earth metal in an amount of from 0.04 to 7 weight percent.

7. The process of claim 1 wherein the catalyst in the last bed contains platinum in an amount of from 0.3 to 1.0 weight percent, chloride ion in an amount of from 0.01 to 8 weight percent and the catalyst in the remaining beds contains platinum in an amount of from 0.3 to 1 weight percent, chloride ion in an amount of from 0.01 to 8 weight percent and yttrium in an amount of from 0.4 to 7 weight percent.

8. The process of claim 1 wherein the rare earth metal is yttrium.

References Cited

UNITED STATES PATENTS

| 2,814,599 | 11/1957 | Lefrancois et al. | 252—466 |
| 2,885,345 | 5/1959 | Hemminger et al. | 208—65 |
| 2,908,628 | 10/1959 | Schneider et al. | 208—65 |
| 3,091,584 | 5/1963 | Singer | 208—65 |
| 3,117,073 | 1/1964 | Hertwig et al. | 208—65 |
| 3,287,253 | 11/1965 | McHenry et al. | 208—65 |

FOREIGN PATENTS

| 820,403 | 9/1959 | Great Britain. |

HERBERT LEVINE, *Primary Examiner.*

U.S. Cl. X.R.

208—138, 139